(12) United States Patent
Watanabe et al.

(10) Patent No.: US 7,839,725 B2
(45) Date of Patent: Nov. 23, 2010

(54) QUADRATURE DETECTION METHOD, QUADRATURE DETECTION DEVICE AND RADIO WAVE TIMEPIECE

(75) Inventors: Takamoto Watanabe, Nagoya (JP); Sumio Masuda, Tokyo (JP)

(73) Assignee: DENSO CORPORATION, Kariya (JP)

( * ) Notice: Subject to any disclaimer, the term of this patent is extended or adjusted under 35 U.S.C. 154(b) by 1227 days.

(21) Appl. No.: 11/392,966

(22) Filed: Mar. 30, 2006

(65) Prior Publication Data

US 2006/0222109 A1    Oct. 5, 2006

(30) Foreign Application Priority Data

Apr. 1, 2005    (JP)    ............... 2005-106465

(51) Int. Cl.
G04C 11/02    (2006.01)
H04J 11/00    (2006.01)
H04L 27/00    (2006.01)

(52) U.S. Cl. .................. 368/47; 370/206; 375/326; 455/208

(58) Field of Classification Search .......... 368/47; 455/205, 208, 214, 215, 337, 338; 370/206; 375/261, 326

See application file for complete search history.

(56) References Cited

U.S. PATENT DOCUMENTS

| | | | | |
|---|---|---|---|---|
| 4,245,345 A * | 1/1981 | Gitlin et al. | ............... | 375/231 |
| 5,283,532 A | 2/1994 | Burkhart et al. | | |
| 5,521,887 A * | 5/1996 | Loomis | ............... | 368/47 |
| 5,930,697 A * | 7/1999 | Bohme et al. | ............... | 455/315 |
| 6,996,077 B1 * | 2/2006 | Suenaga et al. | ............... | 370/320 |
| 2003/0137964 A1* | 7/2003 | Suenaga et al. | ............... | 370/342 |
| 2005/0047526 A1 | 3/2005 | Watanabe et al. | | |

FOREIGN PATENT DOCUMENTS

| | | |
|---|---|---|
| DE | 37 33 967 | 4/1989 |
| JP | 2003-060520 | 2/2003 |
| JP | 2004-104555 | 4/2004 |
| JP | 2005-102129 | 4/2005 |

OTHER PUBLICATIONS

Office Action dated May 14, 2009 from the German Patent Office in the corresponding DE Application No. 10 2006 014 858.4-31 (and English Translation).

* cited by examiner

*Primary Examiner*—Vit W Miska
(74) *Attorney, Agent, or Firm*—Posz Law Group, PLC

(57) ABSTRACT

A radio wave timepiece A and a quadrature detection device for executing a quadrature detecting method are disclosed including a receiving antenna 14 for receiving a carrier wave of a long wave standard radio wave on which time information is multiplexed, a quadrature detection circuit 18 for performing quadrature detection of the carrier wave in response to a reference clock CK1, commonly used for timekeeping by a time counter 8, to obtain an in-phase component I and a quadrature component Q of the carrier wave for obtaining an amplitude $A_{N,m}$ of the carrier wave, and a time correction means 22, 24, 26 for obtaining time information depending on the amplitude of the carrier wave from the quadrature detection circuit 18. The time counter 8 is responsive to time information delivered from the time correction means to correct current time.

15 Claims, 7 Drawing Sheets

QUADRATURE DETECTION METHOD, QUADRATURE DETECTION DEVICE AND RADIO WAVE TIMEPIECE

CROSS REFERENCE TO RELATED APPLICATIONS

This application is related to Japanese Patent Application No. 2005-106465 filed on Apr. 1, 2005, the content of which is hereby incorporated by reference.

BACKGROUND OF THE INVENTION

1. Technical Field of the Invention

The present invention relates to a quadrature detection method and a related quadrature detection device for use in demodulating a modulation wave from a carrier wave subjected to amplitude modulation or phase modulation and a radio wave timepiece for extracting time information from a standard broadcast using such a quadrature detection device.

2. Description of the Related Art

In the related art, attempts have heretofore been made to provide a radio wave timepiece with a structure wherein a long wave standard radio wave subjected to amplitude modulation with time information, is received to allow time information to be demodulated from a reception signal to correct an own clock time.

With such a radio wave timepiece, it has been a normal practice to increase the reception sensitivity on the long wave standard radio wave through the use of a narrow-band-pass filter (quartz-crystal filter), utilizing a crystal oscillator, for passing the reception signal of which only a signal component, corresponding to a frequency of the long wave standard radio wave, is extracted to allow the reception signal, as a result of extraction, to be detected for thereby demodulating time information as disclosed in Japanese Patent Application Laid-Open Publication No. 2003-60520.

However, the quartz-crystal filter is hard to be formed in an integrated structure with the resultant difficulty of forming the related art radio wave timepiece in a miniaturized configuration. Especially, in countries or territories where a plurality of transmission stations transmit long wave standard radio waves at different frequencies (of two kinds including 40 kHz and 60 kHz in Japan) in an area like Japan, the radio wave timepiece usually needs a plurality of quartz-crystal oscillators so as to enable the use of both the frequencies and, therefore, undergoes a difficulty of obtaining the miniaturization in structure. Moreover, due to high costs of the quartz-crystal oscillators, another issue arises in an increase in manufacturing costs of the radio wave timepiece.

In the meanwhile, recently, another attempt has been made to provider a receiver unit that has a capability of demodulating time information from a long wave standard radio wave without the use of quartz-crystal oscillators upon which the reception signal is subjected to quadrature detection as disclosed in Japanese Patent Application Laid-Open Publication No. 2004-104555.

With such a receiver unit mentioned above, the operations are executed to perform quadrature detection of reception signal to demodulate time information in a sequence wherein the reception signal is divided into two distributions to cause the resulting reception signals to be mixed with a sin wave and a cosine wave at the same frequency as that of the long wave standard radio wave upon which an in-phase component I and a quadrature component Q of the long wave standard radio wave are extracted and these signal components I and Q are squared to be added. Although such a sequence needs for a standard signal (a signal at the same frequency as that of the long wave standard radio wave) to be generated for quadrature detection, no need arises for employing the narrow-band quartz-crystal oscillator as required in the related art practice and time information can be demodulated from the long wave standard radio wave.

However, due to the particular structure of the receiver unit proposed in the related art utilizing commonly used quadrature detection technique wherein the reception signals are mixed with the sin wave and the cosine wave, respectively, upon which the in-phase component I and the quadrature component Q of the long wave standard radio wave are extracted, a mixer in a trailing stage for mixing various signals needs to have a filter. Moreover, a distribution circuit has a preceding stage that needs to have an amplifier circuit with an AGC (Automatic Gain Control Circuit).

All of these component parts are made of analogue circuit elements that need to have a large number of outside parts such as resistors and capacitors or the like, resulting in deterioration in demodulating performance on time information due to variations in characteristics and temperature characteristics of these component parts.

Further, in general practice, the radio wave timepiece is comprised of a timekeeping and correction circuit, for keeping current time and correcting the current time based on time information, which is formed of a digital circuit. Therefore, the receiver unit of the related art is extremely difficult to be structured with the digital circuit and one chip with the resultant formation of the radio wave timepiece in a two-chip structure.

Accordingly, even if the radio wave timepiece takes the form of a structure employing the receiver unit mentioned above, issues arise with the occurrence of difficulties of forming the radio wave timepiece in a miniaturized construction and preventing deterioration in characteristics of the receiver unit resulting from temperature variations.

SUMMARY OF THE INVENTION

The present invention has been completed with a view to addressing the above issues and has an object to provide a quadrature detection method and a related quadrature detection device, which are suited for achieving the miniaturization of a structure while providing improved environment resistance, and a radio wave timepiece utilizing such a quadrature detection device.

To achieve the above object, one aspect of the present invention provides a method of performing quadrature detection for demodulating a modulation wave from a carrier wave subjected to amplitude modulation or phase modulation. The method comprises integrating or averaging input signals in sequence for a one-fourth cycle of the carrier wave, adding and subtracting integrated values or average values S1, S2, S3, S4 of the input signals, derived for one cycle of the carrier wave upon the integrating or averaging, to obtain outputs Ik and Qk based on equations expressed as $$I_k = S4_{k-3} + S4_{k-2} - S4_{k-1} - S4_k$$

$$Q_k = S4_{k-3} - S4_{k-2} - S4_{k-1} + S4_k$$

where k=1, 2, 3, ....

Sums $I_{N,m}$ and $Q_{N,m}$ of the outputs Ik and Qk are derived for an N-cycle of the carrier wave based on an equation expressed as $$I_{N,m} = \sum_{k=(m-1)N+1}^{mN} I_k, \quad Q_{N,m} = \sum_{k=(m-1)N+1}^{mN} Q_i, \quad m = 1, 2, 3, \ldots$$

wherein an in-phase component $I_{N,m}$ and a quadrature component $Q_{N,m}$ of the carrier wave are calculated.

With the method of the present invention mentioned above, no need arises for the input signals to be distributed into two lines so as to cause the respective input signals to be mixed with the sine wave and the cosine wave, different in phase from each other by an angle of 90 degrees at the same frequencies as that of the carrier wave subjected to quadrature detection, as required in the related art quadrature detection technique. That is, with the method of the present invention, the input signals are integrated or averaged for a one-fourth cycle of the carrier wave to permit four integrated values or averaged values, derived for one cycle of the carrier wave, to be added and subtracted, thereby extracting the in-phase component Ik and the quadrature component Qk of the carrier wave.

Further, with the in-phase component Ik and the quadrature component Qk obtained for each one cycle of the carrier wave, unwanted signal components cannot be adequately removed (more specifically, under conditions where frequency components evenly times the frequency of the carrier wave can be removed whereas the other frequency components cannot be removed). To address such an issue, the present invention contemplates to take a step of adding the in-phase component Ik and the quadrature component Qk for N-cycles of the carrier wave, respectively, whereby a passing bandwidth for the unwanted signal components is narrowed to enable the in-phase component $I_{N,m}$ and the quadrature component $Q_{N,m}$ of the carrier wave to be extracted in high precision.

With the method of the present invention, further, increasing the number (the number of accumulations) N of adding the in-phase component Ik and the quadrature component Qk, obtained for each one cycle of the carrier wave, enables the passing bandwidth for the unwanted signal components to be narrowed. Thus, no need arises for removing the unwanted signal components with the use of particular component parts such as a filter or the like as required in the related art practice.

With the method of the present invention, furthermore, even though a signal processing circuit needs to be provided for integrating or averaging the input signals for each one-fourth cycle of the carrier wave, no need arises for the steps of dividing the input signals into two distributions and mixing the inputs signal with the sine wave and the cosine wave.

Moreover, the method of the present invention may be implemented using an A/D converter, playing a role as a circuit means for integrating or averaging the input signals for the one-fourth cycle of the carrier wave, which is configured to provide an output with the number of bits in the order of approximately 14 bits that are enough to address an amplitude of the input signals with noise in the order of approximately 50 dB. Thus, an amplifier with a fixed gain can be adopted without a need for employing an amplifier circuit with ADC as required in the related art practice.

With the method of the present invention, therefore, a quadrature detection device can be realized at a low cost in a further miniaturized structure than that of the related art. Applying such a quadrature detection device to a radio wave timepiece enables a long wave standard radio wave to be detected, resulting in the miniaturization of the radio wave timepiece with reduction in manufacturing costs.

Further, the method of the present invention enables the use of a digital circuit, composed of a variety of gate circuits, which plays a role as a signal processing circuit for integrating or averaging the input signals. Therefore, the method of the present invention enables the realization of a quadrature detection device that is resistant to environments such as noise and temperature variations (with environment resistance capability). Thus, the input signals can be subjected to quadrature detection in a stabilized fashion with less adverse affect from the temperature variations than that experienced in the related art practice.

By the way, with the method of the present invention, the signal processing circuit, by which the integrated values or average values of the input signals can be obtained, may be comprised of any circuits provided that the input signals can be integrated or averaged for a given time interval (that is, for a one-fourth cycle) depending on a cycle of the carrier wave but may preferably comprise a digital circuit.

In addition, a commonly used digital type integrating and averaging circuit is configured in a structure to achieve sampling (A/D conversion) of the input signals in synchronism with a given sampling frequency to allow the calculation of average values of the input signals (digital data) subjected to the samplings executed plural times in the past. In order to apply such a circuit to the method of the present invention, the sampling frequency needs to be higher than that of the carrier wave to be detected to allow the integrating and averaging circuit to operate at a high speed.

With the method of the present invention, the integrating or averaging the input signals may be executed using a pulse delay circuit including a plurality of cascade connected delay units. The input signals are applied to the pulse delay circuit as signals for controlling a delay time of the delay units. A pulse signal is applied to the pulse delay circuit to allow the pulse signal to sequentially pass in delay with a delay time caused by the delay units and, subsequently, the number of stages of the delay units, which the pulse signal passes through the pulse delay circuit, is counted for thereby deriving the integrated values (average values).

That is, under cases where the pulse delay circuit is caused to operate in such a way mentioned above, a delay time, appearing when the pulse signal passes through the delay units of the pulse delay circuit, varies depending on signal levels of the input signals and the amount of fluctuations in the delay time is averaged in a phase when the pulse signal passes through the plurality of delay units.

With the method of the present invention, the pulse delay circuit is caused to operate in such a manner described above for counting the number of stages of the delay units, which the pulse signal passes through the pulse delay circuit, for a given cycle (that is, for the one-fourth cycle of the carrier wave) determined for obtaining the integrated values (average values). This results a moving average of the signal levels of the input signals to be derived and, thus, a result of the count can be sequentially output as a moving average deviation.

Accordingly, with the method of the present invention mentioned above, the integrated values (average values) of the input signals can be derived with the use of a single circuit composed of the pulse delay circuit. Thus, no need arises for executing A/D conversion of the input signals at a high speed for obtaining the integrated values (average values) of the input signals, enabling the method of the present invention to be implemented at low costs in a reliable fashion.

In the meanwhile, the in-phase component $I_{N,m}$ and the quadrature component $Q_{N,m}$ of the carrier wave may be output intact as detection results of the input signals and, more preferably, using these parameters allows an amplitude, a phase or both of these factors of the carrier wave to be derived for outputs as detection results.

More particularly, in case of a radio wave timepiece wherein a long wave standard radio wave is amplitude modulated in terms of time information, for the purpose of executing quadrature detection of a reception signal for demodulating a modulation wave (that is, time information), an amplitude of the carrier wave may be suffice to be obtained to allow the relevant value to be output.

The amplitude of the carrier wave may be derived in demanded precisions upon deriving an amplitude $A_{N,m}$ of the carrier wave, a square value $A_{N,m}^2$ of the amplitude and an amplitude approximate value $A_{N,m}'$ based on respective equations expressed as $$A_{N,m} = \sqrt{I_{N,m}^2 + Q_{N,m}^2}$$

$$A_{N,m}^2 = I_{N,m}^2 + Q_{N,m}^2$$

$$A_{N,m}' = \max(|I_{N,m}|, |Q_{N,m}|) + |I_{N,m}| + |Q_{N,m}|$$

where a function max (x, y) represents a numeric value in large one of x, y)

Further in a case where the carrier wave is modulated in phase, a phase $P_{N,m}$ of the carrier wave may be derived using an equation expressed as $$p_{N,m} = \tan^{-1} \frac{Q_{N,m}}{I_{N,m}}$$

Another aspect of the present invention provides a quadrature detection device for demodulating a modulation wave from a carrier wave subjected to amplitude modulation or phase modulation. With the quadrature detection device, signal processing means sequentially integrates or averages input signals for a one-fourth cycle of the target carrier wave to be detected and adder and subtractor means adds and subtracts integrated values or average values S1, S2, S3, S4 of the input signals, derived for one cycle of the carrier wave upon the integrating or averaging, to calculate outputs Ik and Qk based on equations expressed as $$I_k = S4_{k-3} + S4_{k-2} - S4_{k-1} - S4_k$$

$$Q_k = S4_{k-3} - S4_{k-2} - S4_{k-1} + S4_k$$

where k=1, 2, 3, . . . .

Accumulator means derives sums $I_{N,m}$ and $Q_{N,m}$ of the outputs Ik and Qk for an N-cycle of the carrier wave for thereby calculating an in-phase component $I_{N,m}$ and a quadrature component $Q_{N,m}$ of the carrier wave based on an equation expressed as $$I_{N,m} = \sum_{k=(m-1)N+1}^{mN} I_k, \quad Q_{N,m} = \sum_{k=(m-1)N+1}^{mN} Qi, \quad m = 1, 2, 3, \ldots$$

Accordingly, with such a quadrature detection device mentioned above, the input signals can be subjected to quadrature detection in highly increased environment resistance with an increase in reliability. Also, the quadrature detection device can be easily formed in a miniaturized structure at low costs.

With the quadrature detection device, the signal processing means may comprise a pulse delay circuit including a plurality of cascade connected delay units for outputting a pulse signal in delay with a delay time depending on the input signals to allow the pulse signal to sequentially pass in delay with a delay time caused by the delay units and count means for counting the number of stages of the delay units which the pulse signal passes through the pulse delay circuit for the one-fourth cycle of the input signals. Thus, count values resulting from the count means are obtained as the integrated values or the average values S1, S2, S3, S4 of the input signals. With such a structure of the quadrature detection device, the input signals can be subjected to quadrature detection in various advantageous effects set forth above.

Further, with the present embodiment, the quadrature detection device may further comprise amplitude calculation means for calculating an amplitude $A_{N,m}$ of the carrier wave, a square value $A_{Nm}^2$ of the amplitude and an amplitude approximate value $A_{N,m}'$ using the in-phase component $I_{N,m}$ and the quadrature component $Q_{N,m}$ of the carrier wave based on respective equations expressed as $$A_{N,m} = \sqrt{I_{N,m}^2 + Q_{N,m}^2}$$

$$A_{N,m}^2 = I_{N,m}^2 + Q_{N,m}^2$$

$$A_{N,m}' = \max(|I_{N,m}|, |Q_{N,m}|) + |I_{N,m}| + |Q_{N,m}|$$

where a function of max (x, y) represents a numeric value in large one of x, y. With such a structure of the quadrature detection device of the present embodiment, the amplitude or an equivalent value of the amplitude of the carrier wave, subjected to the quadrature detection, can be output. Applying such parameters to a device, such as a radio wave timepiece or the like, which needs to demodulate a modulation wave from the carrier wave that has been modulated in amplitude results in various advantages such as a miniaturized structure, reduction in cost and a high reliability in a timekeeping output.

With the present embodiment, the quadrature detection device may further comprises phase calculation means for calculating a phase $P_{N,m}$ of the carrier wave based on the in-phase component $I_{N,m}$ and the quadrature component $Q_{N,m}$ of the carrier wave using an equation expressed as $$p_{N,m} = \tan^{-1} \frac{Q_{N,m}}{I_{N,m}}$$

With such a structure of the quadrature detection device, the phase of the carrier wave, subjected to quadrature detection, can be derived. Applying such a parameter to a device, such as a radio wave timepiece or the like, which needs to demodulate a modulation wave from the carrier wave that has been modulated in amplitude results in various advantages such as a miniaturized structure, reduction in cost and a high reliability in a timekeeping output.

Another aspect of the present invention provides a radio wave timepiece comprising timekeeping means for keeping current time in response to a given reference clock, a receiving antenna for receiving a standard radio wave having an amplitude modulated in terms of time information representing the current time, and detection means including quadrature detection means for extracting an in-phase component and a quadrature component of the carrier wave and amplitude calculation means for calculating an amplitude of the carrier wave in response to the in-phase component and the quadrature component of the carrier wave. Time correction means demodulates time information in response to the amplitude of the carrier wave for thereby correcting the current time in the timekeeping means based on the time information demodulated by the time correction means.

With the radio wave timepiece of the present embodiment, using the quadrature detection means allows time information to be demodulated without the use of outside component parts such as quartz-crystal oscillators or the like. Also, no need arises for preparing an amplifier circuit with AGC or filters for removing unwanted signal components, enabling a radio wave timepiece to be miniaturized in structure with lightweight.

Further, due to ability of forming the quadrature detection means in a digital circuit, the radio wave timepiece can be formed with a single IC chip that is integrated including a digital circuit for timekeeping and time correction, resulting in expanded applications the radio wave timepiece.

With the radio wave timepiece of the present embodiment mentioned above, the amplitude calculation means may further comprise means for calculating the amplitude $A_{N,m}$ of the carrier wave, a square value $A_{Nm}^2$ of the amplitude and an amplitude approximate value $A_{Nm'}$ using the in-phase component $I_{N,m}$ and the quadrature component $Q_{N,m}$ of the carrier wave based on respective equations expressed as $$A_{N,m} = \sqrt{I_{N,m}^2 + Q_{N,m}^2}$$

$$A_{N,m}^2 = I_{N,m}^2 + Q_{N,m}^2$$

$$A_{N,m}' = \max(|I_{N,m}|, |Q_{N,m}|) + |I_{N,m}| + |Q_{N,m}|$$

where a function of max (x, y) represents a numeric value in large one of x, y.

With such a structure of the present embodiment, the amplitude or an equivalent value of the amplitude of the carrier wave, subjected to the quadrature detection, can be output. Applying such parameters to the radio wave timepiece, which needs to demodulate a modulation wave from the carrier wave that has been modulated in amplitude, results in various advantages such as a miniaturized Structure, reduction in cost and a high reliability in a timekeeping output.

With the present embodiment, the timekeeping means may comprise an oscillator for producing the given reference clock, and the quadrature detection device may comprise signal processing means by which the reception signal is integrated or averaged for a cycle that is determined based on an output from the oscillator.

With the radio wave timepiece of the present embodiment mentioned above, further, an operating clock of the quadrature detection device is set based on an output from the oscillator used for generating the reference clock for timekeeping, resulting in no need for preparing the oscillator for generating the operating clock of the quadrature detection device. Thus the radio wave timepiece can be configured in a miniaturized structure with lightweight.

With the radio wave timepiece of the present invention, the time correction means may comprise a binary coding circuit connected to the amplitude calculation means for coding the amplitude of the carrier wave into a coded output, decoding means for decoding the coded output to derive time information, and time verification means for verifying the time information delivered from the decoding means for thereby correcting the current time in the timekeeping means in response to verified time information.

With the radio wave timepiece of the present embodiment mentioned above, the quadrature detection means may comprise signal processing means for sequentially integrating or averaging input signals for a one-fourth cycle of the carrier wave, adder and subtractor means for adding and subtracting integrated values or average values S1, S2, S3, S4 of the input signals, derived for one cycle of the carrier wave upon the integrating or averaging, to calculate outputs Ik and Qk based on equations expressed as $$I_k = S4_{k-3} + S4_{k-2} - S4_{k-1} - S4_k$$

$$Q_k = S4_{k-3} - S4_{k-2} - S4_{k-1} + S4_k$$

where k=1, 2, 3, . . . ; and
accumulator means for obtaining sums $I_{N,m}$ and $Q_{N,m}$ of the outputs Ik and Qk for an N-cycle of the carrier wave for thereby calculating an in-phase component $I_{N,m}$ and a quadrature component $Q_{N,m}$ of the carrier wave based on equations expressed as $$I_{N,m} = \sum_{k=(m-1)N+1}^{mN} I_k, \quad Q_{N,m} = \sum_{k=(m-1)N+1}^{mN} Qi, \quad m = 1, 2, 3, \ldots$$

Accordingly, with such a structure mentioned above, the input signals can be subjected to quadrature detection in highly increased environment resistance with an increase in reliability. Also, the quadrature detection device can be easily formed in a miniaturized structure at low costs.

With the radio wave timepiece of the present embodiment mentioned above, the signal processing means may comprise a pulse delay circuit including a plurality of cascade connected delay units for outputting a pulse signal in delay with a delay time depending on the input signals to allow the pulse signal to sequentially pass in delay with a delay time caused by the delay units, and count means for counting the number of stages of the delay units which the pulse signal passes through the pulse delay circuit for the one-fourth cycle of the input signals. Count values resulting from the count means are obtained as the integrated values or the average values S1, S2, S3, S4 of the input signals.

With the structure mentioned above, the use of a plurality of cascade connected delay units enables the input signals to be applied to the pulse delay circuit as signals for controlling a delay time of the delay units. A pulse signal is applied to the pulse delay circuit to allow the pulse signal to sequentially pass in delay with a delay time caused by the delay units and, subsequently, the number of stages of the delay units, which the pulse signal passes through the pulse delay circuit, is counted for thereby deriving the integrated values or average values in a reliable fashion.

With the radio wave timepiece of the present embodiment mentioned above, the receiving antenna may comprise an antenna for receiving first and second standard radio waves each having an amplitude modulated in terms of time information representing the current time, and first switch means for selecting one of the first and second standard radio waves to be applied to the quadrature detection means.

With such a structure, the radio wave timepiece of the present embodiment is able to meet various sources of standard radio waves multiplexed with time information, respectively, to provide correct time information in a highly reliable manner even in countries having plural sources of standard radio waves.

With the radio wave timepiece of the present embodiment mentioned above, the timekeeping means may comprise an oscillator for producing the given reference clock, a frequency divider for frequency-dividing the reference clock with first and second frequency division ratios to provide first and second reference signals, and second switch means for selecting one of the first and second reference signals for supply to the quadrature detection means. The quadrature detection means is operative to extract the in-phase component and the quadrature component of the carrier wave in response to the one of the first and second reference signals selected by the second switch means.

With the radio wave time piece of the present invention mentioned above, due to the use of reference signals from the oscillator in the quadrature detection device, no need arises for additionally preparing a particular oscillator for the quadrature detection device, resulting in a simplified structure with reduction in costs.

Another aspect of the present invention provides a radio wave timepiece comprising a quartz crystal oscillator oscillating clocks at a given frequency, a frequency divider frequency-dividing the clocks with a given frequency division ratio to generate a reference clock, and timekeeping means counting reference clocks to perform timekeeping for current time. A receiving antenna receives time information multiplexed on a carrier wave of a long wave standard radio wave and a quadrature detection device performs quadrature detection of the carrier wave in response to the reference cock for extracting an in-phase component and a quadrature component of the carrier wave and operative to calculate an amplitude of the carrier wave based on the in-phase component and the quadrature component for demodulating time information multiplexed on the carrier wave. A time verification circuit verifies the time information from the quadrature detection device for correcting the current time of the timekeeping means depending on verified time information.

With the radio wave timepiece of such a structure set forth above, using the quadrature detection means allows time information to be demodulated without the use of outside component parts such as quartz-crystal oscillators or the like. Also, no need arises for preparing an amplifier circuit with AGC or filters for removing unwanted signal components, enabling a radio wave timepiece to be miniaturized in structure with lightweight.

Further, due to ability of forming the quadrature detection means in a digital circuit, the radio wave timepiece can be formed with a single IC chip that is integrated including a digital circuit for timekeeping and time correction, resulting in expanded applications the radio wave timepiece.

DETAILED DESCRIPTION OF THE PREFERRED EMBODIMENTS

Now, a radio wave timepiece of an embodiment according to the present invention is described.

Figure 1:
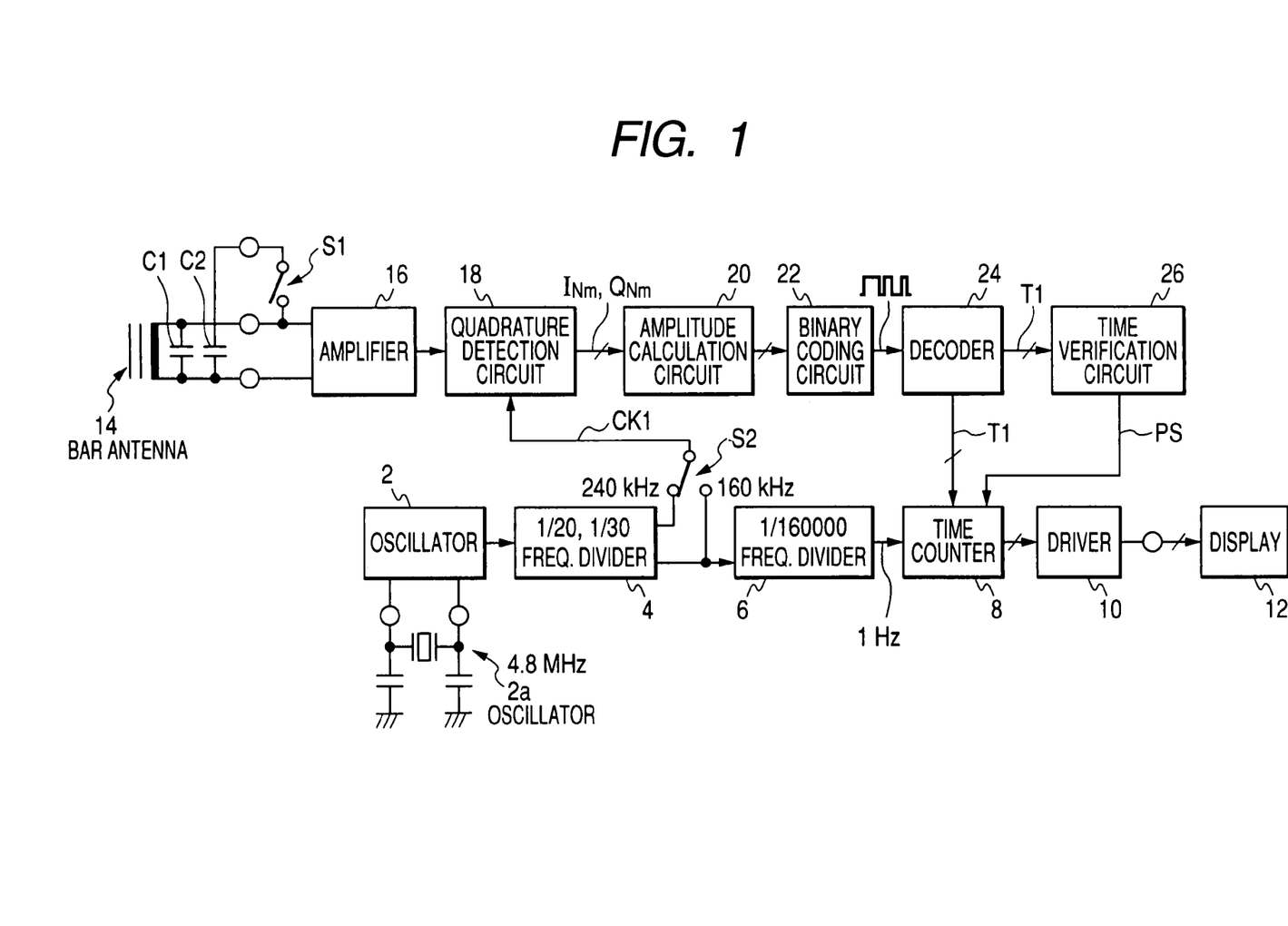
FIG. 1 is a block diagram of an overall structure of a radio wave timepiece of an embodiment according to the present invention.

As shown in FIG. 1, the radio wave timepiece A of the present embodiment is comprised of a quartz crystal oscillator 2a, an oscillator 2 for oscillating clocks at a given frequency (of 4.8 MHz in the present embodiment), a 1/20 and 1/30 frequency divider 4 for frequency-dividing the clock with frequency division ratios of 1/20 and 1/30 to generate a first reference clock (at a frequency of 240 kHz) and a second reference clock (at a frequency of 160 kHz), a 1/16000 frequency divider 6 for frequency-dividing the second reference clock (with the frequency of 160 kHz) with a frequency division ratio of 1/16000 to generate a reference clock with 1 Hz for timekeeping, a time counter 8 for counting the reference clocks, delivered from the second frequency divider 6, to perform timekeeping for current time, and a driver circuit 10 for providing a display of time on a display 12, composed of an LCD or the like, depending on a count value resulting from the time counter 8.

Also, the reason why the first frequency divider 4 generates the two kinds of first and second reference clocks resides in that the radio wave timepiece A of the present embodiment may have domestic applications to have capabilities of receiving either one of long wave standard radio waves with frequencies of 40 kHz and 60 kHz to demodulate time information.

Further, the two kinds of first and second reference clocks, generated by the first frequency divider 4, are set to respective values with frequencies at 160 kHz and 240 kHz four times the frequencies of 40 kHz and 60 kHz. This comes from a reason in that the reference clock is generated at timing for a one-fourth cycle of each long wave standard radio wave. A switch S2 selects one of the reference clocks to be applied to a quadrature detector circuit 18 that is described below in detail.

As shown in FIG. 1, the radio wave timepiece A further includes a bar antenna 14 for receiving two kinds of long wave standard radio waves, an amplifier circuit 16 for amplifying a reception signal from the bar antenna 14, the quadrature detector circuit 18 for performing quadrature detection of the reception signal, amplified by the amplifier circuit 16 using the reference cock selected by means of the switch S2, for extracting an in-phase component $I_{N,m}$ and a quadrature component $Q_{N,m}$ of the carrier wave with the long wave standard radio wave, an amplitude calculation circuit 20 for calculating an amplitude $A_{N,m}$ of the long wave standard radio wave based on the in-phase component $I_{N,m}$ and the quadrature component $Q_{N,m}$ delivered from the quadrature detector circuit 18, a binary coding circuit 22 for binary coding the output from the amplitude calculation circuit 20, a decoder 24 for demodulating time information multiplexed on the carrier wave of the long wave standard radio wave, and a time verification circuit 29 for verifying whether or not time information demodulated by the decoder 24 is correct upon which if time information is found to be correct, then, a preset signal PS is sent to the time counter 8 to allow time information T1, demodulated by the decoder 24, to be read into the time counter 8.

Also, the time verification circuit 26 is configured to operate the various circuits (such as the amplifier circuit 16, the quadrature detector circuit 18, the amplitude calculating circuit 20, the binary coding circuit 22 and the decoder 24), by which time information is demodulated from the long wave standard radio wave, every for a given time interval to correct a count value of the time counter 8 based on time information demodulated from the long wave standard radio wave. During such correcting operation, if no time information is present from the decoder 24 for more than the given time interval or if no variation takes place in time information, then, judgment is made that time information is absent, thereby inhibiting time information from being written into the time counter 8.

Moreover, with capacitors C1, C2 connected in parallel to the bar antenna 14, a so-called resonant antenna is structured. The bar antenna 14 is associated with a switch S1 that is operative to change capacities of the capacitors connected in parallel to each other to set a resonant frequency to either a frequency of 40 kHz or a frequency of 60 kHz.

The switch S1 is switched over in connection with the switch S2 that switches over the first and second reference clocks to be applied to the quadrature detector circuit 18. That is, when the long wave standard radio wave at the frequency of 40 kHz is required, the switch S1 is turned on and the switch S2 is switched over to apply the second reference clock at the frequency of the 160 kHz to the quadrature detector circuit 18. In contrast, when the long wave standard radio wave at the frequency of 60 kHz is desired, the switch S1 is turned off and the switch S2 is switched over to apply the first reference clock at the frequency of the 240 kHz to the quadrature detector circuit 18.

With the present embodiment, the switches S1, S2 may be actuated either manually or in an automatic fashion in response to a command signal from the time verification circuit 26. That is, the time verification circuit 26 may take the form of a structure wherein if the operation is executed to acquire time information described above with no success in getting time information, the switches S1, S2 are switched over the time verification circuit 26 to change a target of the long wave standard radio waves to be received for obtaining time information.

As a result, with the radio wave timepiece of the present embodiment, either one of the two kinds of the long wave standard radio waves, transmitted from transmitting stations at two locations in Japan, can be utilized for enabling automatic correction of clock time in the time counter 8.

Also, with the radio wave timepiece A of the present embodiment, the time counter 8 corresponds to a timekeeping means; the bar antenna 14 corresponds to an receiving antenna; the quadrature detector circuit 18 and the amplitude calculating circuit 20 correspond to a wave detection means; and the binary coding circuit 22, the decoder 24 and the time verification circuit 26 correspond to a time correction means.

Now, the quadrature detector circuit 18, forming an essential part of the present invention, is described below.

Figure 2:
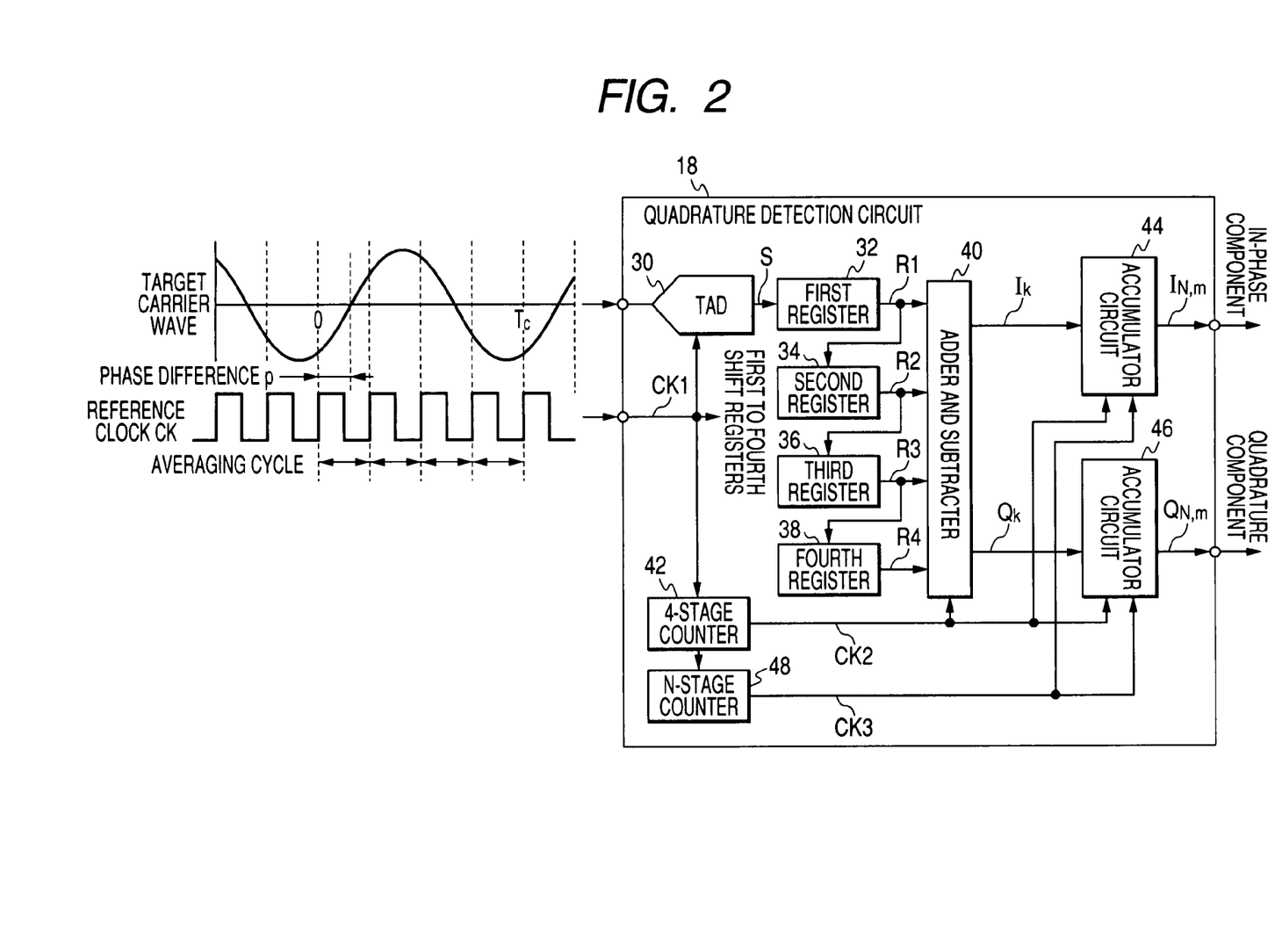
FIG. 2 is a block diagram showing a structure of a quadrature detection device forming part of the radio wave timepiece shown in FIG. 1.

As shown in FIG. 2, the quadrature detector circuit 18 is comprised of a time A/D conversion circuit (hereinafter merely referred to as "TAD") 30, playing a role as a signal processing means, for averaging a reception signal for each one cycle (that is, for a one-fourth cycle Tc of a target carrier wave on a long wave standard radio wave to be detected) of the reference clock CK1 applied upon operation of the switch S2, first to fourth registers 32, 34, 36, 38 for sequentially latching average values S derived from the TAD 30 for each one cycle of the reference clock CK1, an adder and subtractor circuit 40 that performs adding and subtracting of average values R1 to R4 latched by the registers 32 to 38, a 4-stage counter 42 that generates an operating clock CK2 for the adder and subtractor circuit 40 based on the one-fourth frequency divided signal (in other word, a signal with the same cycle as that of a carrier wave of a long wave standard radio wave) based on the reference signal CK1, two accumulation circuits 44, 46 that accumulate outputs from the adder and subtractor circuit 40, and an N-stage counter 48 for counting the operating clock CK2 output from the 4-stage counter 42 to generate an operating clock CK3, composed of a signal derived upon frequency-dividing the operating clock CK2 with a frequency division ratio of 1/N (in other word, a signal N-times the cycle of the carrier wave on the long wave standard radio wave) which are applied to the accumulation circuits 44, 46.

Also, the TAD 30 plays a role as a signal processing means; the adder and subtractor circuit 40 plays a role as an adder and subtractor means 40; and the accumulation circuits 44, 46 play a role as accumulator means.

Figure 3:
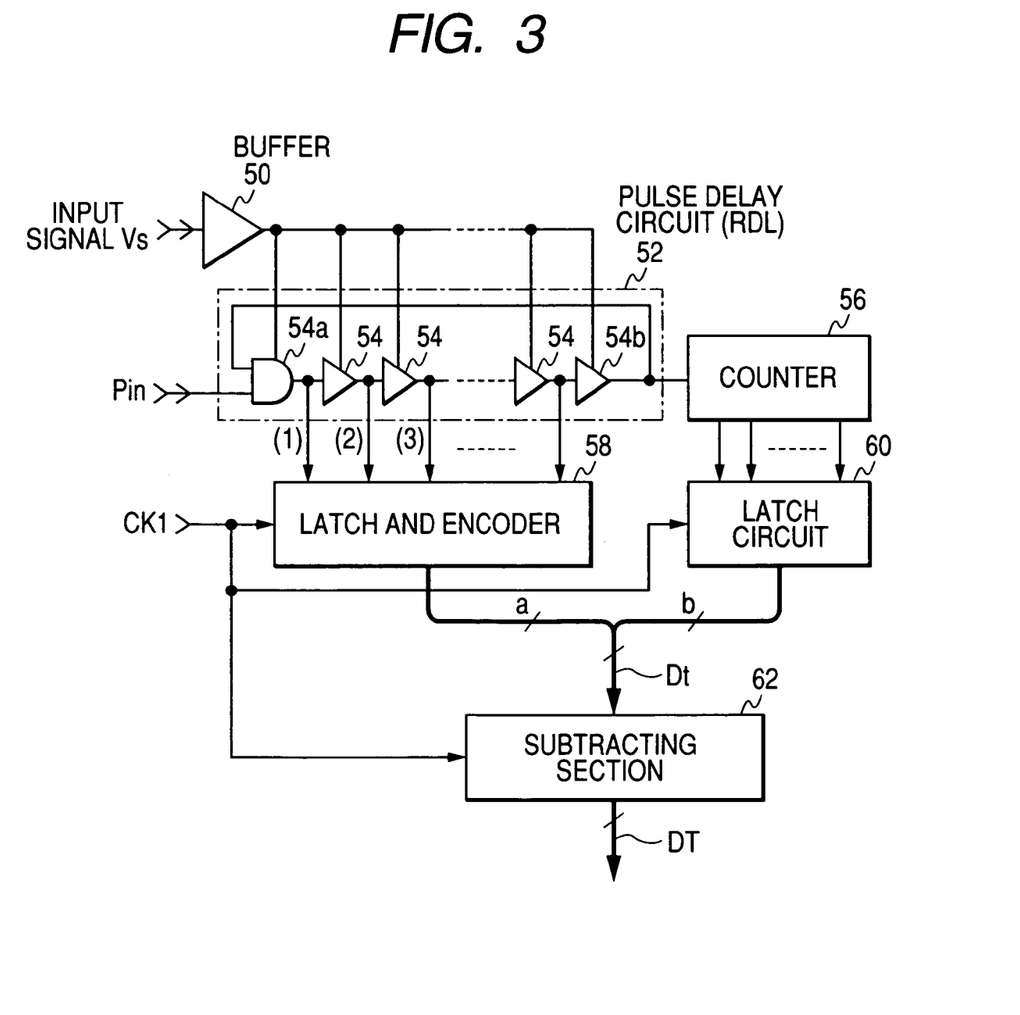
FIG. 3 is a block diagram showing a structure of a TAD forming part of the quadrature detection device shown in FIG. 2.

As shown in FIG. 3, the TDA 30 is comprised of a pulse delay circuit 52 (that is, a so-called ring delay line (RDL)) including a plurality of delay units 54 connected in a ring configuration that is operative such that as a startup signal Pin is applied to an initial stage delay unit 54a, the initial stage delay unit 54a delivers a pulse signal to a subsequent stage delay unit 54b in sequence upon which the pulse signal is returned from a final stage delay unit 54b to the initial stage delay unit 54a to allow the pulse signal to be cyclically transferred, a counter 56 that counts the number of cyclic transfers of the pulse signal within the pulse delay circuit 52, a latch and encoder 58 that is operative to detect (latch) an arrival location of the pulse signal in the pulse delay circuit 52 at a timing associated with a leading (or trailing) edge of the reference lock CK1 to provide a detection result upon which the detection result is converted to digital data with given bits representing which stage of the plural delay units 54, counting from the top of the stages, the pulse signal passes through, a latch circuit 50 that latches a count value of the counter 56 at a timing associated with a leading (or trailing) edge of the reference signal CK1, and a subtracting section 62 applied with higher-order bit data "b" output from the latch circuit 60 and lower-order bit data "a" output from the latch and encoder 58 to allow the resultant input data Dt to be latched at the timing associated with the leading (or trailing) edge of the reference clock CK1 for thereby obtaining a difference with respect to a preceding value latched before one cycle of the reference clock CK1.

The plural delay units 54, forming the pulse delay circuit 52, include gate circuits, composed of inverters or the like, and are applied with an input signal (that is, reception signal) Vs from the amplifier circuit 16 as a power source voltage.

Therefore, a delay time caused by the delay units 54 results in a time, depending on a voltage level of the input signal Vs, and the subtracting section 62 provides an output (that is, data DT representing the number of stages of the delay units 54 which the pulse signal passes though the pulse delay circuit 54 for one cycle of the reference clock CK1) that has the average value S derived by averaging the voltage level of the reception signal appearing within the relevant cycle.

Figure 4:
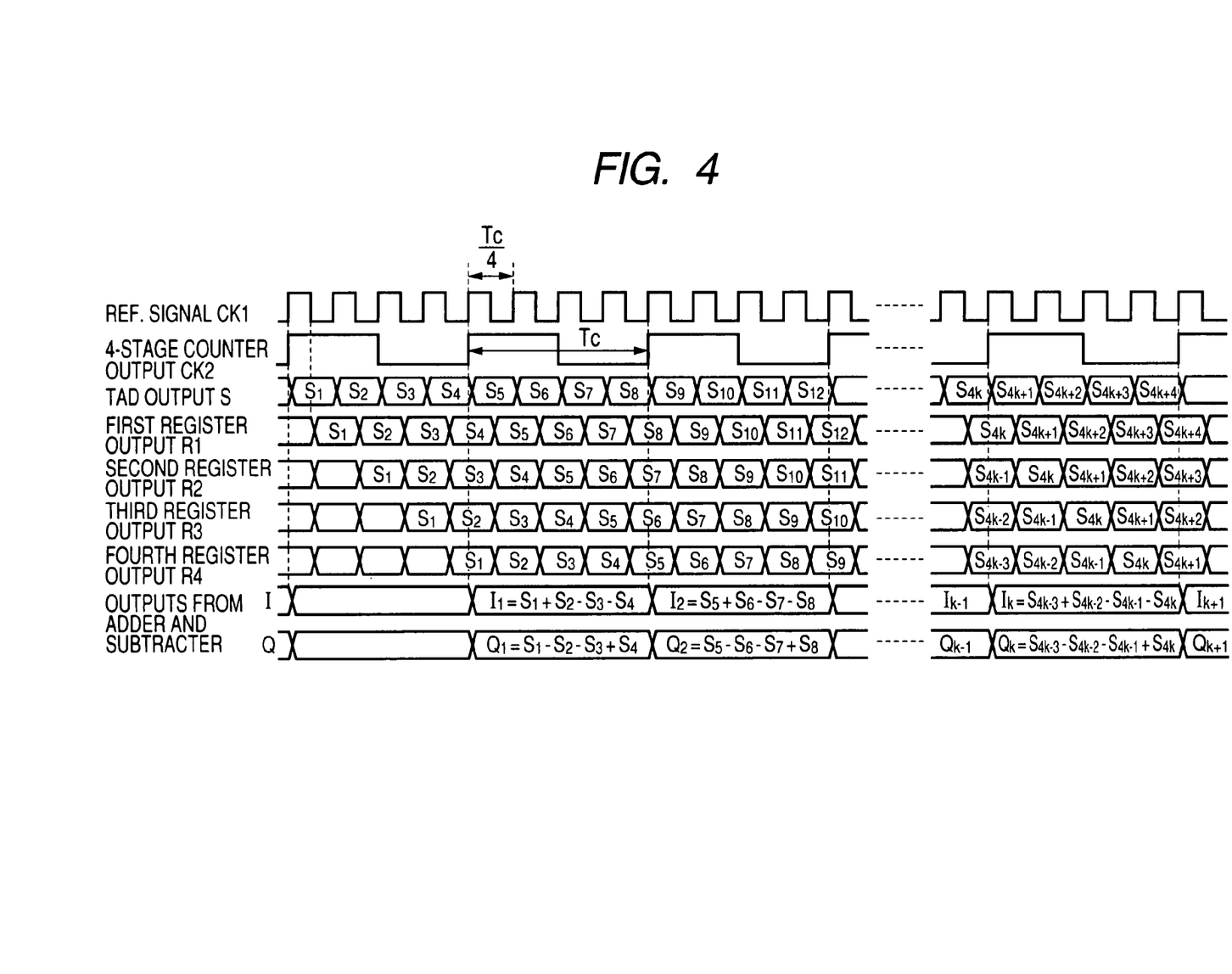
FIG. 4 is a timing chart representing waveforms of various signals associated with the TAD, registers and an adder and subtractor circuit shown in FIG. 2.

Next, as shown in FIG. 4, the adder and subtractor circuit 40 operates to add and subtract four average values S1, S2, S3, S4, output from the TAD 30 in synchronism with the reference clock CK1 and consecutively latched by the first to fourth registers 32 to 38, thereby obtaining outputs I, Q based on Equations expressed as:

$$I = S1 + S2 - S3 - S4$$

$$Q = S1 - S2 - S3 + S4$$

Such calculating operations are repeatedly performed for one cycle Tc of the operating clock CK2 (that is, in synchronism with one cycle Tc of the carrier wave on the long wave standard radio wave).

Figure 5:
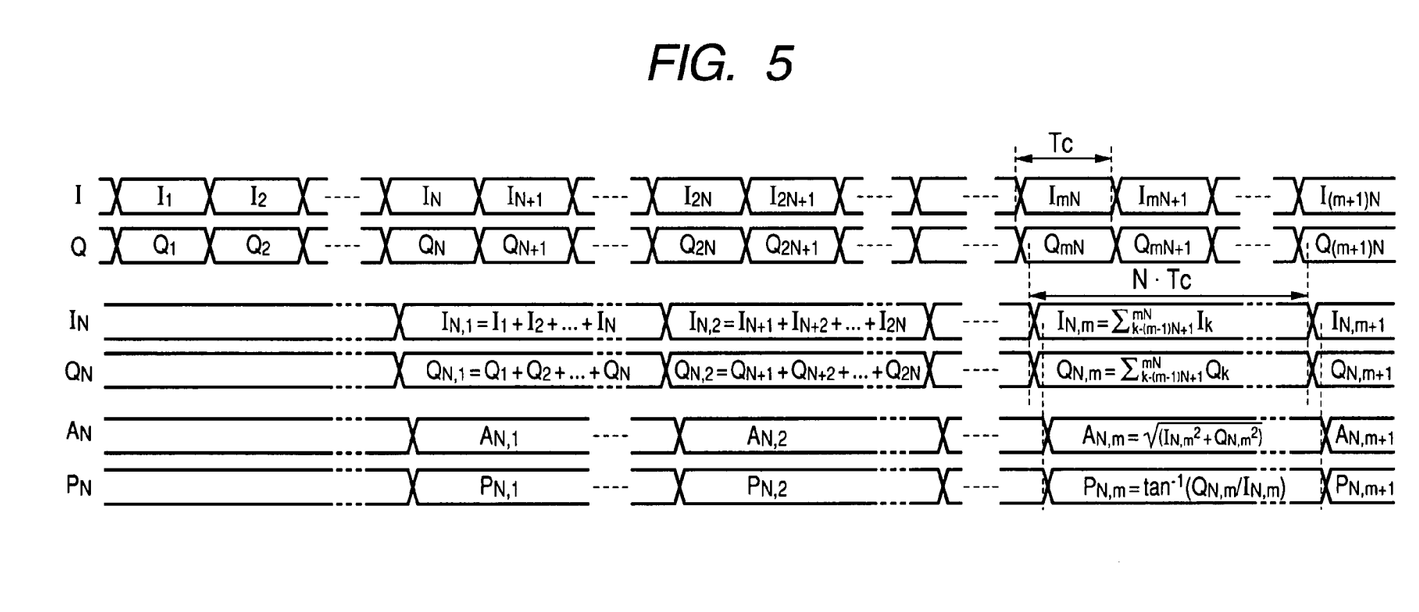
FIG. 5 is a timing chart representing waveforms of various signals associated with the adder and subtractor circuit, accumulating circuits, shown in FIG. 2, and an amplitude calculation circuit shown in FIG. 1.

Further, as shown in FIG. 5, the accumulation circuits 44, 46 are operative to add the calculation results I, Q output from the adder and subtractor circuit 40 each time the operating clock CK2 of the adder and subtractor circuit 40 is received for outputting the calculation results $I_N$, $Q_N$ to the amplitude calculation circuit 20 at a timing associated with a leading (or trailing) edge of the operating clock CK3 output from the N-stage counter 48.

That is, the accumulation circuits 44, 46 are operative to generate the in-phase component $I_N$ and the quadrature component $Q_N$, from which unwanted signal components in adding operation are removed, upon adding the in-phase component I and the quadrature component Q of the carrier wave, acquired by the adder and subtractor circuit 40 for one cycle of the long wave standard radio wave, for a period amounting to N cycles of the long wave standard radio wave.

FIGS. 6A to 6D show frequency-dependent calculation results on amplitude outputs acquired when varying the number N of calculation times for the outputs I, Q of the accumulation circuits 44, 46, with the abscissa axis representing a ratio "r" between an input signal frequency "f" and a synchronizing signal frequency of fc=1/Tc and the ordinate axis representing an amplitude. As apparent from these drawing figures, if the number of calculation times is expressed as N=1, a notch area, in which the amplitude is zeroed, appears at only a part in which "r" is even number. The number of notch areas increases with an increase in the number N of calculation times and components except for the frequency component, in which "r" is odd number, decrease with an increase in the number N of accumulation times.

Figure 6A:
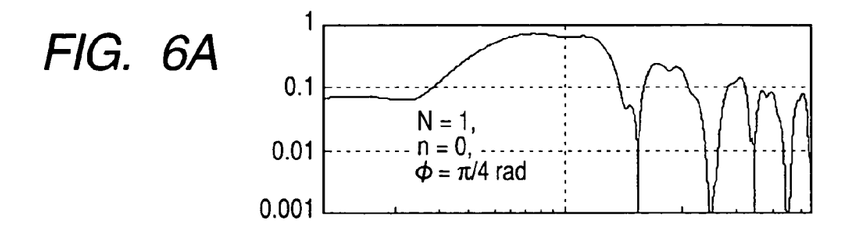
FIGS. 6A to 6E are illustrative views showing the relationship between the number of accumulation times and a frequency bandwidth in the quadrature detection circuit of the embodiment shown in FIGS. 1 and 2.
Figure 6B:
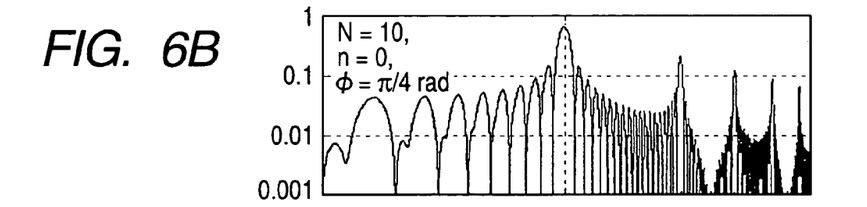
Figure 6C:
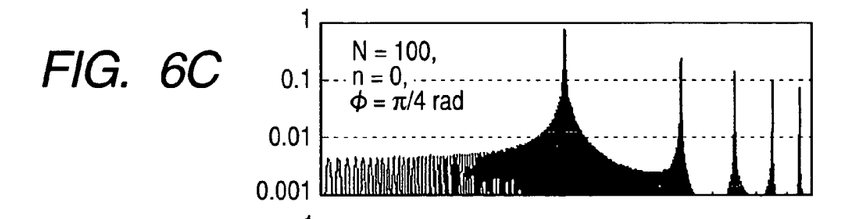
Figure 6D:
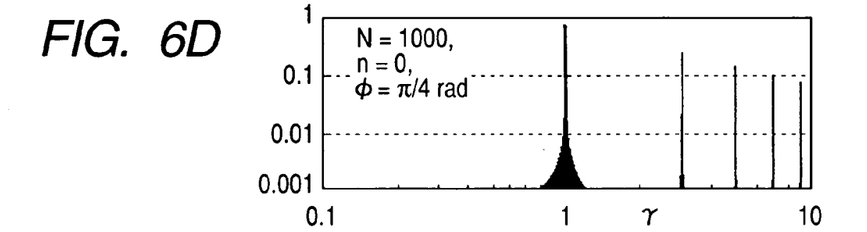
Figure 6E:
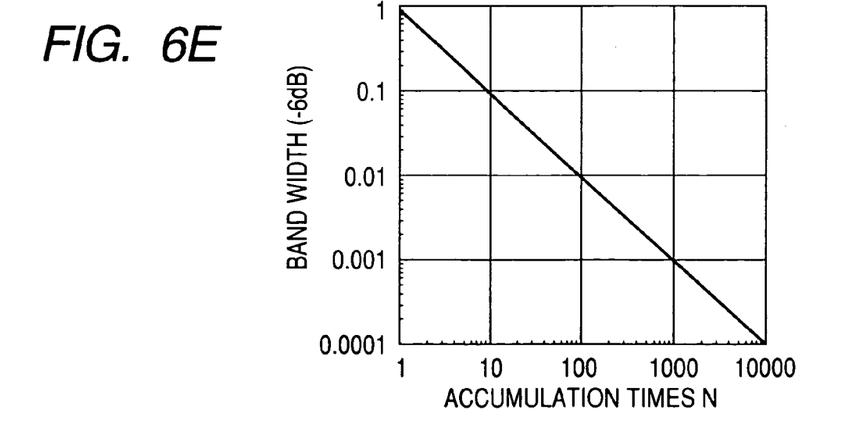

That is, if a bandwidth, in which an attenuation lies at a value of −6 dB around a frequency expressed as f=fc where r=1, is represented as a function of the number N of calculation times, the bandwidth varies as shown in FIG. 6E such that a bandwidth of an output of the quadrature detector circuit 18 decreases as the number N of calculation times increases. As the number N of calculation times increases, a quadrature detection wave from which unwanted components, except for the target carrier wave to be detected, are removed comes close to an ideal value.

However, as the number N of calculation times increases, time resolution NTc lengthens and, hence, the number N of calculation times needs to be selected in consideration of the bandwidth and time resolution.

Thus, with the present embodiment, the time verification circuit 26 is configured to set the count number of the N-stage counter 48 so as to set the number N of calculation times. Thus, a value of the number N of calculation times for the quadrature detection wave is set to be N=2000 for the long wave standard radio wave with a frequency of 40 kHz and N=3000 for the long wave standard radio wave with a frequency of 60 kHz.

This is due to the fact that for these values, the detection wave output has time resolutions with values expressed as 2000/40 kHz=3000/60 kHz=50 ms for identifying pulse widths in the order of 200 ms, 500 ms and 800 ms of the modulation waves on the long wave standard radio wave in Japan.

Subsequently, although the in-phase component $I_N$ and the quadrature component $Q_N$ for the carrier wave of the long wave standard radio wave, generated by the quadrature detector circuit 18 in response to the reception signal, are applied to the amplitude calculation circuit 20 to allow the same to obtain the amplitude $A_N$ of the carrier wave of the long wave standard radio wave as shown in FIG. 5, the present embodiment contemplate the provision of a simplified structure of the amplitude calculation circuit 20 and, to this end, the amplitude is calculated based on the calculation formulae expressed in the Equations 4 and 9.

That is, the amplitude calculation may be performed so as to obtain a legitimate amplitude $A_N$ based on the calculation formulae expressed in the Equations 2 and 7 set forth above or may be performed so s to obtain a square value of the amplitude $A_N$ based on the calculation formulae expressed in the Equations 3 and 3 described above. With the former calculation, square root extracting operation and multiplication need to be performed and the former calculation needs no square root extracting operation but needs multiplication. Thus, with the present embodiment, the calculation method, described above, is employed to enable the amplitude calculation circuit 20 to be formed in the simplest structure.

Figure 7:
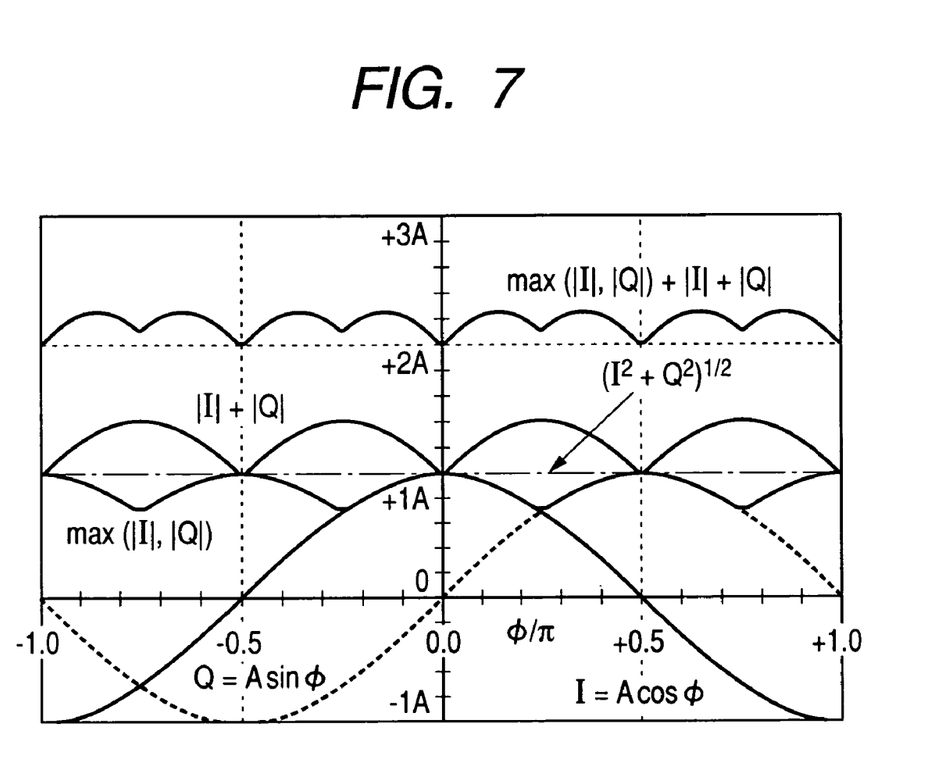
FIG. 7 is an illustrative view for illustrating the operation of the amplitude calculation circuit shown in FIG. 1.

Moreover, FIG. 7 shows various values, resulting from die calculation formulae expressed in the Equations 4 and 9 in case of I=A cos Φ and Q=A sine Φ, in terms of a function of a deflection angle Φ. As shown in FIG. 7, the amplitude $A_N$, acquired from the calculation formulae expressed in the Equations 4 and 9, has a ripple of approximately 10% with respect to the deflection angle. With the radio wave timepiece of the present embodiment, the resulting amplitude $A_N$ is binary coded for thereby demodulating time information, causing less ripple to occur with no occurrence of practical issues.

As set forth above, with the radio wave timepiece of the present embodiment, the long wave standard radio wave is extracted from the reception signal and the relevant amplitude is detected using the quadrature detector circuit 18 composed of the TAD 30 and the various calculation circuits, enabling a digital circuit to be entirely formed except for the amplifier circuit 15. Therefore, the radio wave timepiece has an internal circuitry, expect for the display 12, which can be integrated into one chip in an easy fashion, enabling a radio wave timepiece to be miniaturized in a lightweight structure.

Furthermore, the quadrature detector circuit 18 has a structure, comprised of the TAD 30 and the various calculation circuits, which can be entirely formed in a digital circuit that is less subject to adverse affects such as temperature variations or the like, while permitting quadrature detection to be executed in an optimum fashion at all times. Moreover, particularly, the quadrature detector circuit 18, forming part of the present embodiment, has capability of adequately removing unwanted noise components through operation of the accumulation circuit 44, 46 to perform the multiplication of the outputs I and Q with no need for preparing an independent filter for removing unwanted signal components, resulting in advantages effect of achieving the miniaturization and integration.

While the present invention bas been described above with reference to one embodiment, it will be appreciated that the present invention is not limited to such one embodiment and may be implemented in a variety of alternative modes within the spirit and scope of the present invention.

For example, while the present embodiment has been mentioned above with reference to the radio wave timepiece incorporating the quadrature detector circuit 18 to which the present invention is applied, it will be appreciated that upon appropriately setting the number of accumulating the outputs I, Q of the accumulation circuits 44, 46, the frequency bandwidth can be arbitrarily set in the quadrature detector circuit 18 and, thus, the quadrature detector circuit 18 can be utilized as a receiving unit for except for that of the radio wave timepiece and a high frequency filter.

Moreover, while the present embodiment has been described with reference to an exemplary structure wherein the outputs $I_N$, $Q_N$ from the quadrature detector circuit 18 are used for the amplitude calculation circuit 20 to calculate the amplitude $A_N$, the amplitude calculation circuit 20 may be configured in a structure to enable the calculation of the amplitude $A_N$ and, in addition thereto, the phase $P_N$ based on the Equation "5" and the Equation "6" mentioned above an while, depending on applications, only the phase $P_N$ may be calculated.

While the specific embodiment of the present invention has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A radio wave timepiece, comprising:
    timekeeping means for keeping current time in response to a given reference clock, the timekeeping means including
        an oscillator for producing the given reference clock, and
        a frequency divider for frequency-dividing the reference clock with first and second frequency division ratios to provide first and second reference signals;
    a receiving antenna including an antenna for receiving first and second standard radio waves each having an amplitude modulated in terms of time information representing the current time;
    first switch means adapted to the receiving antenna, for switching the standard radio wave between the first and second standard radio waves, the switched radio wave being used as a carrier wave;
    second switch means adapted to the time keeping means, for switching between the first and second reference signals;
    detection means including quadrature detection means for extracting an in-phase component and a quadrature component from the carrier wave and amplitude calculation means for calculating an amplitude of the carrier wave in response to the in-phase component and the quadrature component of the carrier wave; and
    time correction means for demodulating time information in response to the amplitude of the carrier wave for correcting the current time in the timekeeping means based on the time information demodulated by the time correction means, wherein
    the quadrature detection means is operative to extract the in-phase component and the quadrature component from the carrier wave in response to the one of the first and second reference signals switched by the second switch means.

2. The radio wave timepiece according to claim 1, wherein the amplitude calculation means comprises means for calculating the amplitude $A_{N,m}$ of the carrier wave, a square value $A_{Nm}^2$ of the amplitude and an amplitude approximate value $A_{N,m'}$ using the in-phase component $I_{N,m}$ and the quadrature component $Q_{N,m}$ of the carrier wave based on respective equations expressed as $A_{N,m} = \sqrt{I_{N,m}^2 + Q_{N,m}^2}$ $A_{N,m}^2 = I_{N,m}^2 + Q_{N,m}^2$ $A_{N,m}' = \max(|I_{N,m}|, |Q_{N,m}|) + |I_{N,m}| + |Q_{N,m}|$ where a function of max (x, y) represents selecting the largest numeric value from x, y.

3. The radio wave timepiece according to claim 1, wherein the quadrature detection means comprises signal processing means by which the reception signal is integrated or averaged during a period of cycle that is determined based on an output from the oscillator.

4. The radio wave timepiece according to claim 1, wherein the time correction means comprises a binary coding circuit connected to the amplitude calculation means for coding the amplitude of the carrier wave into a coded output, decoding means for decoding the coded output to derive time information, and time verification means for verifying the time information delivered from the decoding means for correcting the current time in the timekeeping means in response to verified time information.

5. The radio wave timepiece according to claim 1, wherein the quadrature detection means comprises:
    signal processing means for sequentially processing input signals for a one-fourth cycle of the carrier wave;
    calculating means for calculating integrated values and average values of the input signals, derived for one cycle of the carrier wave upon the integrating or averaging, to calculate outputs $I_k$ and $Q_k$ based on equations expressed as $I_k = S4_{k-3} + S4_{k-2} - S4_{k-1} - S4_k$ $Q_k = S4_{k-3} - S4_{k-2} - S4_{k-1} + S4_k,$ where S1, S2, S3, S4 represent the average values and k represents 1, 2, 3, . . . ; and
    accumulator means for obtaining sums $I_{N,m}$ and $Q_{N,m}$ of the outputs Ik and Qk for an N-cycle of the carrier wave for calculating an in-phase component $I_{N,m}$ and a quadrature component $Q_{N,m}$ of the carrier wave based on equations expressed as $$I_{N,m} = \sum_{k=(m-1)N+1}^{mN} I_k, \ Q_{N,m} = \sum_{k=(m-1)N+1}^{mN} Q_i, m = 1, 2, 3, \dots .$$

6. The radio wave timepiece according to claim 5, wherein the signal processing means comprises:
    a pulse delay circuit including a plurality of cascade connected delay units for outputting a pulse signal with a delay time depending on the input signals to allow the pulse signal to sequentially pass with a delay time caused by the delay units; and
    count means for counting the number of stages of the delay units through which the pulse signal passes in the pulse delay circuit during the one-fourth cycle of the input signals,
    wherein count values resulting from the count means are obtained as ones of the integrated values and the average values S1, S2, S3, S4 of the input signals.

7. A radio wave timepiece comprising:
    a quartz crystal oscillator producing a clock signal at a given frequency;
    a frequency divider frequency-dividing the clock signal with a given-frequency division ratio switched between predetermined different ratios to generate a reference clock;
    timekeeping means counting reference clocks to perform timekeeping for current time;
    a receiving antenna receiving time information multiplexed on a carrier wave of a long wave standard radio wave of which frequency is switched between predetermined different frequencies;

a first switch circuit adapted to switch the frequency of the long wave standard radio wave to be received by the receiving antenna; and
a second switch circuit adapted to switch the given frequency division ratio between predetermined different ratios, wherein
the given frequency division ratio is switched by the second switch circuit in accordance with the first switch circuit;
a quadrature detection device performing quadrature detection of the carrier wave in response to the reference clock for extracting an in-phase component and a quadrature component of the carrier wave and operative to calculate an amplitude of the carrier wave based on the in-phase component and the quadrature component for demodulating time information multiplexed on the carrier wave; and
a time verification circuit for verifying the time information from the quadrature detection device for correcting the current time of the timekeeping means depending on a verified time information.

8. A radio wave timepiece comprising:
a quartz crystal oscillator oscillating clocks at a given frequency;
a frequency divider frequency-dividing the clocks with a given-frequency division ratio to generate a reference clock;
timekeeping means counting reference clocks to perform timekeeping for current time;
a receiving antenna receiving time information multiplexed on a carrier wave of a long wave standard radio wave;
a quadrature detection device performing quadrature detection of the carrier wave in response to the reference clock for extracting an in-phase component and a quadrature component of the carrier wave and operative to calculate an amplitude of the carrier wave based on the in-phase component and the quadrature component for demodulating time information multiplexed on the carrier wave; and
a time verification circuit for verifying the time information from the quadrature detection device for correcting the current time of the timekeeping means depending on a verified time information,
wherein quadrature detection device is configured to calculate the amplitude of the carrier wave using an approximate value $A_{N,m}'$ calculated using the in-phase component $I_{N,m}$ and the quadrature component $Q_{N,m}$ of the carrier wave based on an equation expressed as $$A_{N,m}'=\max(|I_{N,m}|,|Q_{N,m}|)+|I_{N,m}|+|Q_{N,m}|$$

where a function of max (x, y) represents selecting the largest numeric value from x, y.

9. A radio wave timepiece, comprising:
timekeeping means for keeping current time in response to a given reference clock;
a receiving antenna for receiving a standard radio wave as a carrier wave having an amplitude modulated in terms of time information representing the current time;
detection means including quadrature detection means for extracting an in-phase component and a quadrature component of the carrier wave and amplitude calculation means for calculating an amplitude of the carrier wave in response to the in-phase component and the quadrature component of the carrier wave; and
time correction means for demodulating time information in response to the amplitude of the carrier wave for correcting the current time in the timekeeping means based on the time information demodulated by the time correction means, wherein
the amplitude calculation means comprises means for calculating the amplitude of the carrier wave using an approximate value $A_{N,m}'$ calculated using the in-phase component $I_{N,m}$ and the quadrature component $Q_{N,m}$ of the carrier wave based on an equation expressed as $$A_{N,m}'=\max(|I_{N,m}|,|Q_{N,m}|)+|I_{N,m}|+|Q_{N,m}|$$

where a function of max (x, y) represents selecting the largest numeric value from x, y.

10. The radio wave timepiece according to claim 9, wherein:
the timekeeping means comprises an oscillator for producing the given reference clock; and
the quadrature detection means comprises signal processing means by which the reception signal is integrated or averaged during a period of cycle that is determined based on an output from the oscillator.

11. The radio wave timepiece according to claim 9, wherein:
the time correction means comprises a binary coding circuit connected to the amplitude calculation means for coding the amplitude of the carrier wave into a coded output, decoding means for decoding the coded output to derive time information, and time verification means for verifying the time information delivered from the decoding means for correcting the current time in the timekeeping means in response to verified time information.

12. The radio wave timepiece according to claim 9, wherein:
the quadrature detection means comprises:
signal processing means for sequentially processing input signals for a one-fourth cycle of the carrier wave;
calculating means for calculating integrated values and average values of the input signals, derived for one cycle of the carrier wave upon the integrating or averaging, to calculate outputs $I_k$ and $Q_k$ based on equations expressed as $$I_k=S4_{k-3}+S4_{k-2}-S4_{k-1}-S4_k$$

$$Q_k=S4_{k-3}-S4_{k-2}-S4_{k-1}+S4_k,$$

where S1, S2, S3, S4 represent the average values and k represents 1, 2, 3, . . . ; and
accumulator means for obtaining sums $I_{N,m}$ and $Q_{N,m}$ of the outputs Ik and Qk for an N-cycle of the carrier wave for calculating an in-phase component $I_{N,m}$ and a quadrature component $Q_{N,m}$ of the carrier wave based on equations expressed as $$I_{N,m} = \sum_{k=(m-1)N+1}^{mN} I_k, Q_{N,m} = \sum_{k=(m-1)N+1}^{mN} Qi, m = 1, 2, 3, \ldots .$$

13. The radio wave timepiece according to claim 12, wherein:
the signal processing means comprises
a pulse delay circuit including a plurality of cascade connected delay units for outputting a pulse signal with a delay time depending on the input signals to allow the pulse signal to sequentially pass with a delay time caused by the delay units; and count means for counting the number of stages of the delay units through which the pulse signal passes in the pulse delay circuit for during the one-fourth cycle of the input signals, wherein count values resulting from the count means are obtained as ones of the integrated values and the average values S1, S2, S3, S4 of the input signals.

14. The radio wave timepiece according to claim 9, wherein the receiving antenna comprises an antenna for receiving first and second standard radio waves each having an amplitude modulated in terms of time information representing the current time, and first switch means for switching the standard radio wave between the first and second standard radio waves, the switched standard radio wave is applied to the quadrature detection means.

15. The radio wave timepiece according to claim 9, wherein the timekeeping means comprises an oscillator for producing the given reference clock;

a frequency divider for frequency-dividing the reference clock with first and second frequency division ratios to provide first and second reference signals; and second switch means for selecting one of the first and second reference signals for supply to the quadrature detection means, wherein the quadrature detection means is operative to extract the in-phase component and the quadrature component of the carrier wave in response to the one of the first and second reference signals selected by the second switch means.

* * * * *